(12) United States Patent
Yang et al.

(10) Patent No.: US 8,107,468 B2
(45) Date of Patent: Jan. 31, 2012

(54) NON-BLOCKING MULTICAST SWITCHING SYSTEM AND A METHOD FOR DESIGNING THEREOF

(75) Inventors: Yuanyuan Yang, East Setauket, NY (US); Takashi Oguma, Kawasaki (JP)

(73) Assignee: Media Global Links Co., Ltd., Kawasaki-shi (JP)

( * ) Notice: Subject to any disclaimer, the term of this patent is extended or adjusted under 35 U.S.C. 154(b) by 0 days.

(21) Appl. No.: 12/312,363

(22) PCT Filed: Nov. 6, 2007

(86) PCT No.: PCT/JP2007/071586
§ 371 (c)(1),
(2), (4) Date: Aug. 13, 2009

(87) PCT Pub. No.: WO2008/056684
PCT Pub. Date: May 15, 2008

(65) Prior Publication Data
US 2010/0027535 A1   Feb. 4, 2010

Related U.S. Application Data

(63) Continuation-in-part of application No. 11/593,756, filed on Nov. 7, 2006, now abandoned.

(51) Int. Cl.
*H04L 12/50* (2006.01)
(52) U.S. Cl. .......................................... 370/388; 385/17
(58) Field of Classification Search .................. 370/388, 370/380; 385/17; 340/2.22
See application file for complete search history.

(56) References Cited

U.S. PATENT DOCUMENTS

| | | | | |
|---|---|---|---|---|
| 5,450,074 | A | * | 9/1995 | Yoshifuji ................. 340/2.22 |
| 5,451,936 | A | * | 9/1995 | Yang et al. ............... 340/2.22 |
| 5,801,641 | A | * | 9/1998 | Yang et al. ............... 340/2.22 |
| 5,940,389 | A | * | 8/1999 | Yang et al. ................ 370/380 |
| 7,397,796 | B1 | * | 7/2008 | Smiljani ................... 370/390 |

(Continued)

FOREIGN PATENT DOCUMENTS

WO     WO 2005/027390 A2    3/2005

OTHER PUBLICATIONS

NPL 1: Yuanyuan Yang; Jianchao Wang, "A new design for wide-sense nonblocking multicast switching networks," Communications, 2004 IEEE International Conference on , vol. 2, No., pp. 998-1002 vol. 2, Jun. 20-24, 2001.*

(Continued)

*Primary Examiner* — Ayaz Sheikh
*Assistant Examiner* — Mounir Moutaouakil
(74) *Attorney, Agent, or Firm* — Day Pitney LLP

(57) ABSTRACT

A conventional technology does not show that the number of middle stage switches is minimized on a non-blocking condition of a multisource and possible multicast Clos type network, and it becomes a high cost system. Further, no addition or deletion of a connection can be done without a data loss. It is an object to provide, as a means for solving the problems, a multisource and multicast possible Clos type network based on such a technology that the number of middle stage switches is minimized on a non-blocking condition and that addition/deletion of a connection to a existing multicast tree can be carried out without a data loss, so that the network can be operated at low cost without a data loss.

10 Claims, 6 Drawing Sheets

U.S. PATENT DOCUMENTS

| | | | |
|---|---|---|---|
| 7,424,010 B2 * | 9/2008 | Konda | 370/388 |
| 7,424,011 B2 * | 9/2008 | Konda | 370/388 |
| 7,596,135 B1 * | 9/2009 | Iovine et al. | 370/388 |
| 7,609,695 B2 * | 10/2009 | Zhu et al. | 370/392 |
| 2003/0086420 A1 * | 5/2003 | Li | 370/386 |
| 2003/0112797 A1 * | 6/2003 | Li et al. | 370/360 |
| 2004/0008674 A1 * | 1/2004 | Dubois | 370/388 |
| 2004/0056757 A1 | 3/2004 | Konda | |
| 2005/0105517 A1 | 5/2005 | Konda | |
| 2005/0157713 A1 * | 7/2005 | Klausmeier et al. | 370/388 |
| 2006/0159078 A1 * | 7/2006 | Konda | 370/386 |
| 2006/0165085 A1 * | 7/2006 | Konda | 370/395.1 |
| 2007/0248302 A1 * | 10/2007 | Collings | 385/37 |

OTHER PUBLICATIONS

NPL 2: Yang, Y. 1998. A Class of Interconnection Networks for Multicasting. IEEE Trans. Comput. 47, (Aug. 8, 1998), 899-906.*

NPL 3: Yang, Y. and Masson, G. M. 1999. The Necessary Conditions for Clos-Type Nonblocking Multicast Networks. IEEE Trans. Comput. 48, (Nov. 11, 1999), 1214-1227.*

Yuanyuan Yang, Nonblocking WDM Multicast Switching Networks, IEEE Transactions on Parallel and Distributed Systems, vol. 11, No. 12, Dec. 2000.

* cited by examiner

Matrix switch

× : Crosspoint
a, b, c, d : Input port
x, y, z : Output port
31, 32, 33 : Partial switch

NON-BLOCKING MULTICAST SWITCHING SYSTEM AND A METHOD FOR DESIGNING THEREOF

CROSS-REFERENCE TO RELATED APPLICATION

This application is the U.S. National Stage of International Application No. PCT/JP2007/071586, filed Nov. 6, 2007, which is a continuation-in-part of U.S. patent application Ser. No. 11/593,756, filed Nov. 7, 2006 now abandoned.

BACKGROUND OF THE INVENTION

1. Field of the Invention

The present invention pertains to a non-blocking multicast switching network for a multiplexed source.

2. Description of the Related Art

Traditionally, an $N_1 \times N_2$ Clos multicast network consists of three stages of switch modules. It has $r_1$ switch modules of size $n_1 \times m$ in the input stage, m switch modules of size $r_1 \times r_2$ in the middle stage, and $r_2$ switch modules of size $m \times n_2$ in the output stage. Here, as shown in FIG. 1, total number of input lines $N_1$ is $n_1 \times r_1$, and total number of input lines $N_2$ is $n_2 \times r_2$. In such a network, there is exactly one link between every two switch modules in two consecutive stages, and each switch module is assumed to be multicast-capable. The conventional technology has demonstrated that when m takes certain values, the three-stage Clos network has full multicast capability in a non-blocking manner.

Patent Reference 1: Japanese Unexamined Patent Application Publication No. 2007-504772

Recently, as the new technology develops, more powerful switching elements are commercially available. In such a switch, each port of the switch can simultaneously support multiple data streams from independent sources. We call this type of switch multi-source switches. In general, an s×s multi-source multicast switch has s input ports and s output ports, and each port has k independent links. The switch can connect from any input link to any set of output links. We can simply call the switch an s×s k-source switch. The switch can function as a sk×sk ordinary multicast switch. In fact, the internal implementation of such a switch is packet switching. For example, letting k=5, an s×s multi-source switch with 10G bandwidth on each port is equivalent to an sk×sk ordinary switch with 2G bandwidth on each link.

However, in the conventional technology, refinement of the number of the middle stage switches in a Clos network having full multicast capability for multi-source in a non-blocking manner has not been disclosed, thereby causing high cost. Moreover, an algorithm for addition or deletion of connections to the existing multicast tree has not been disclosed, and the addition or deletion of connections could not be carried out without loss of data.

SUMMARY OF THE INVENTION

In the present invention, a non-blocking multicast switching network is constructed by using the above multi-source switching elements in the three-stage Clos network. The $N_1 \times N_2$ multicast network in the present invention has $N_1$ input ports and $N_2$ output ports with each port having k links. We call this multistage network k-source $N_1 \times N_2$ multistage network. Compared to the ordinary Clos network, the major difference is that in the k-source multistage switching network, there are k links between every two switch modules in two consecutive stages as shown in FIG. 2.

The present invention provides the refinement of number of the middle stage switches (not number of cross-points as traditional cost metric) in Clos network having full multicast capability for multi-source in a non-blocking manner. Moreover, the present invention provides the algorithm for addition or deletion of connections to the existing multicast tree without loss of data.

According to the present invention, the refinement of number of the middle stage switches in Clos network having full multicast capability for multi-source in a non-blocking manner is provided, thereby providing the aforementioned network at low cost. Moreover, the algorithm for addition or deletion of connections to the existing multicast tree makes it possible to operate the network without loss of data.

DETAILED DESCRIPTION OF THE PREFERRED EMBODIMENTS

Embodiments of the present invention will be described hereinbelow with reference to the drawings. The present invention is not to be limited to the above embodiments and able to be embodied in various forms without departing from the scope thereof.

Note that relationships between the following embodiments and claims are as follows. The first embodiment will mainly describe Claims 1, 2, 3, and 4. The second embodiment will mainly describe Claims 5, 6, 7, and 8. The third embodiment will mainly describe Claim 9. The fourth embodiment will mainly describe Claim 10.

First Embodiment

Concept of First Embodiment

In a first embodiment, we will provide a system and a design method for the refinement of the number of the middle stage switches in a Clos network having full multicast capability for multi-source in a non-blocking manner.

The 'non-blocking' is a state, in which a connection path in the network is provided for any connection request, thereby making a connection without interrupting other existing connections. The 'arbitrary connection request' is a request for arbitrarily executing new output from the output stage switch for a new input or existing input to an idle port of the input stage on the assumption that the output stage switch for the output exists. In other words, the request is for executing the new output from an arbitrary switch of the output stage.

Configuration of First Embodiment

The first embodiment is a non-blocking multicast switching system and the design method thereof. The non-blocking multicast switching system of the first embodiment comprises three stages of an input stage, a middle stage, and an output stage, said respective stages comprising a plurality of switches capable of multicasting, wherein each switch of the input stage comprises at least $n_1$ input ports, each switch of the output stage comprises at least $n_2$ output ports, each switch of the input stage comprises at least one line connected to each of all switches of the middle stage, each switch of the middle stage comprises at least one line connected to each of all switches of the output stage, a signal of said each line is multiplexed k times at maximum, where $k \geq 1$, and in cases where number of switches of the output stage is $r_2$ and number of switches of the middle stage is m, (A1) is established:

$$m > \min_{1 \leq x \leq \min\{n_2 - 1, r_2\}} \left\{ \left\lfloor \left(n_1 - \frac{1}{k}\right)x \right\rfloor + (n_2 - 1)r_2^{\frac{1}{x}} \right\} \quad (A1)$$

The non-blocking multicast switching system of the first embodiment configures a Clos network having three stages of an input stage, a middle stage, and an output stage, comprising a plurality of switches, as shown in a network configuration diagram of FIG. 2.

The 'stage' is an aggregation of switches, which have a plurality of switches and more than one layer. In cases where one stage consists of a plurality of layers, the plurality of layers can be equivalently included in the one stage. Moreover, a network including a plurality of stages in one stage (i.e., an input stage and an output stage are configured in one stage) corresponds to the Clos network. The 'switch' corresponds to a switch that can output a signal from an arbitrary input port to an arbitrary output port though a matrix structure in the switch as shown in FIG. 3.

The 'Clos network' is an ideal network, in which network switches are logically connected in more than three layers, thereby configuring a large-scale network, and the number of ports in the middle stage is larger than that of the input stage or of the output stage, thereby enabling communication of signal from the arbitrary input to the arbitrary output without interrupting other communication, or being interrupted by other communication (i.e., non-blocking communication is implemented).

The non-blocking multicast switching system of the first embodiment consists of three stages of an input stage, a middle stage, and an output stage, said respective stages comprising a plurality of switches capable of multicasting.

The 'multicast' corresponds to transmission of data to designated destinations on the network. Therefore, it corresponds to one-to-many data transmission (a plurality of outputs for one input).

In the non-blocking multicast switching system, each switch of the input stage comprises at least $n_1$ input ports, and each switch of the output stage comprises at least $n_2$ output ports.

Therefore, as shown in FIG. 2, considering the entire system, each input port of each switch in the input stage performs as system input, and one switch in the input stage has at least $n_1$ input ports for line. Each output port of each switch in the output stage performs as system output, and one switch in the output stage has at least $n_2$ output ports for line.

The 'line' is a transmission path for connection between the switches in each stage, and is a physical medium connected to the output port and the input port. One line can be connected to one port. Signals for a plurality of sources can be simultaneously transmitted in one line. Therefore, the one line can consist of the plurality of channels. Examples of the lines include an optical fiber, a metal conductor, and a wireless connection line using light, electromagnetic wave, or sound. Additionally, a channel included in one line is not necessarily configured by a physical optical fiber etc., and a plurality of channels may be configured by a plurality of optical fibers.

In the multicast switching system, each switch of the input stage comprises at least one line connected to each of all switches of the middle stage, and each switch of the middle stage comprises at least one line connected to each of all switches of the output stage.

Therefore, one arbitrary switch in the input stage is connected to all switches in the middle stage via at least one line from an output port to an input port. One arbitrary switch in the middle stage is connected to all switches in the output stage via at least one line from an input port to an output port.

In the multicast switching system, a signal of the each line is multiplexed k times at maximum, where $1 \leq k$.

Therefore, as shown in FIG. 2, information (source or channel) multiplexed k times at maximum can be transmitted via one line of input/output port in the each stage. For example, a plurality of different video sources of contents can be multiplexed and transmitted. The respective switches of the first embodiment can receive input of the multiplexed source (channel) from the input port, can carry out demultiplexing or new multiplexing within the k times, and outputting source from the output port.

The 'multiplexing' corresponds to multiplexing signals in a separable state to simultaneously transmit a plurality of information via one line. The multiplexing on one line may be carried out through one transmission path or a plurality of transmission paths.

The WDM (Wavelength Division Multiplexing), which are generally utilized, may be utilized for the multiplexing. The WDM is, for example, used for communication via an optical fiber. In the WDM, a plurality of optical signals having different wavelength can be simultaneously multiplexed on the optical fiber, thereby dramatically increasing transmission quantity of information on the optical fiber. DWDM (Dense WDM) is high-density WDM. The DWDM may be utilized for the first embodiment. The WDM or DWDM are the conventional technology, so that the detailed descriptions thereof are omitted. Note that, in the first embodiment, the multiplexing method is not limited to the WDM or DWDM, and Pulse Address Multiplexing (PAM), Time Division Multiplexing (TDM), Frequency Division Multiplexing (FDM), Code Division Multiplexing (CDM), or Polarization Division Multiplexing (PDM) may be utilized.

In the multicast switching system, in cases where number of switches of the output stage is $r_2$ and number of switches of the middle stage is m, (A1) is established.

Therefore, in the non-blocking multicast switching system, in cases where a minimum value of number of input ports of each switch in the input stage is $n_1$, a minimum value of number of output ports of each switch in the output stage is $n_2$, number of switches of the output stage is $r_2$, and a maximum value of the multiplexing of a signal of the each line is k (a maximum value of multiplexing for one line), number of switches in the middle stage m required for implementing a non-blocking multicast switching system is acquired by (A1). Here at, x in (A1) indicates an upper limit value of an upper limit value of number of the middle stage switches for one source due to system limitation, and is acquired with m by (A1). The $\lfloor \ \rfloor$ in (A1) is a floor function, and indicates a maximum integral value, which does not exceed a value in $\lfloor \ \rfloor$. The first nomial on the right-hand side of (A1) indicates number of middle stage switches, which have been connected and cannot be newly connected, and the second nomial indicates the number of switches in the middle stage required for implementing a non-blocking multicast switching system.

The detailed description of (A1) is provided.

<Detailed Description of (A1)>

For simplicity, we first consider the symmetric network, that is, $N_1 = N_2 = N$, $n_1 = n_2 = n$, and $r_1 = r_2 = r$, and then extend to the general case.

In the ordinary Clos type multicast network, we defined the destination set of a middle stage switch as the set of labels of output stage switches that are connected from this middle stage switch. However, in the case of the k-source Clos type multicast network, a middle stage switch can have up to k connections to an output stage switch. Thus, we must consider a destination multiset with elements that may have a multiplicity larger than 1 as defined in following notations. Let $O=\{1, 2, \ldots, r\}$ denote the set of labels of all output stage switches numbered from 1 to r. Since there can be up to k multicast connections from a middle stage switch $j\in\{1, 2, \ldots, m\}$ to an output stage switch $p\in O$, one on each link, we shall use $M_j$ to represent the destination multiset (whose base set is O), where p may appear more than once if more than one multicast connections are from j to p. The number of times p appears in $M_j$, or the number of multicast connections from j to p, is called the multiplicity of p in multiset $M_j$. More specifically, denote the multiset $M_j$ as $$M_j = \{1^{i_{j1}}, 2^{i_{j2}}, \ldots, r^{i_{jr}}\} \quad (1)$$

where $0 \leq i_{j1}, i_{j2}, \ldots, i_{jr} \leq k$ are the multiplicities of elements 1, 2, ..., r, respectively. Notice that if every multiplicity is less than k, i.e. $0 \leq i_{j1}, i_{j2}, \ldots, i_{jr} \leq k-1$, then the maximal multicast connection that can be realized through middle stage switch j without interfering any existing connections is $\{1, 2, \ldots, r\}$ (in terms of the set of output stage, switches reachable from middle stage switch j). In general, the maximal multicast connection that can go through middle stage switch j is $\{p | 0 \leq i_{jp} < k, \text{ for } 1 \leq p \leq r\}$.

The explanation of (A1) is provided, hereinbelow. (A1) expresses channels, which have been used between the jth switch in the middle stage and the output stage, by using the set. The respective elements on the right-hand side of (A1) indicate number of channels from the middle stage switches to each output stage switch. For example, the first element indicates that $i_{j1}$ channels connected to the first switch in the output stage have already been used. The second element indicates that $i_{j2}$ channels connected to the second switch in the output stage have already been used. Thus, set for the jth middle stage switch can be defined, for example, similar set for each middle stage switch such as first middle stage switch or the second middle stage switch can be defined. In order to obtain the maximal multicast connection that can go through two middle stage switches j and h, we define the intersection of multisets as follows.

$$M_j \cap M_h = \{1^{\min\{i_{j1}, i_{h1}\}}, 2^{\min\{i_{j2}, i_{h2}\}}, \ldots, r^{\min\{i_{jr}, i_{hr}\}}\} \quad (2)$$

Then the maximal multicast connection that can go through two middle stage switches j and h is the maximal multicast connection that can go through a middle stage switch with its destination multiset equal to multiset $M_j \cap M_h$.

From the point of realizing a multicast connection, which is characterized as an ordinary set, we can see that those elements in $M_j$ with multiplicity k cannot be used. Accordingly, we define the cardinality of $M_j$, number of output stage switches unreachable from the selected middle stage switch j, as $$|M_j| = |\{p | p^k \in M_j \text{ for } 1 \leq p \leq r\}| \quad (3)$$

and the null of $M_j$ as $$M_j = \phi \text{ iff } |M_j| = 0 \quad (4)$$

A new multicast connection request with fanout r can be satisfied using some $x (x \geq 1)$ middle stage switches, say, $i_1, \ldots, i_x$, from among the available middle switches if and only if the intersection of the destination sets of these x middle stage switches is empty, i.e. $\cap_{j=1}^{x} M_{ji} = \phi$.

Now we are in the position to extend the results of nonblocking conditions for an ordinary multicast network to that for a k-source multicast network, i.e. the destination multiset being a multiset with multiplicity no more than k as defined in (1), and their operations are defined in (2)-(4).

Therefore, the Theorem 1 is obtained.

<Theorem 1>

For any x, $1 \leq x \leq \min\{n-1, r\}$, let m' be the minimum number of middle stage switches, number of connectable middle stage switches required for implementing a non-blocking, whose destination multisets satisfy that their multiplicities are no more than k, that there are at most (nk-1) 1's, (nk-1) 2's, ..., (nk-1) r's distributed among the m' destination multisets, and that the intersection of any x of the destination multisets is not empty. Then we have $$m' \leq (n-1) r^{\frac{1}{x}}$$

The Proof of Theorem 1 is described hereinafter.

<Proof of Theorem 1>

Suppose these m' middle switches are 1, 2, ..., m' with destination multisets $M.sub.1, M.sub.2, \ldots, M.sub.m'$, which are nonempty multisets by the assumptions. Clearly, by using (3) and (4) we have that $$0 \leq |M_i| \leq r \text{ for } 1 \leq i \leq m'$$

Notice that at most (nk-1) 1's, (nk-1) 2's, ..., (nk-1) r's are distributed among the m' multisets. Moreover, from (3), k multiple of the same element in $M_i$ contributes a value 1 to $|M_i|$. Thus, for any $j (1 \leq j \leq r)$, (nk-1) multiple of element j contributes a value no more than $[(k-1)/k]$ to $\sum_{i=1}^{m'} |M_i|$. We have $$\sum_{i=1}^{m'} |M_i| \leq \left\lfloor \frac{nk-1}{k} \right\rfloor r = \left\lfloor \frac{nk-1}{k} \right\rfloor (n-1) r$$

Let $M_{j1}$ be the multiset such that $$|M_{j1}| = \min_{1 \leq i \leq m'} |M_i|$$

Then, we obtain that $$m' |M_{j1}| \leq \sum_{i=1}^{m'} |M_i| \leq (n-1) r$$

and thus $$m' \leq \frac{(n-1)r}{|M_{j1}|} \quad (5)$$

by noting that $|M_{j1}| > 0$

Without loss of generality, suppose that in multiset $M_{j1}$, the $|M_{j1}|$ elements each with multiplicity k are 1, 2, ..., $|M_{j1}|$. Now, consider m' new multisets $M_j \cap M_i$ for $1 \leq i \leq m'$. From (2), (3) and the assumption that the intersection of any two multisets is nonempty, we have $$0 < |M_j \cap M_i| \leq |M_{j1}|$$

and only elements 1, 2, ..., $|M_{j1}|$ in multiset $M_j \cap M_i$ may have multiplicity k, thus can make a contribution to the value of $|M_j \cap M_i|$. Notice that at most (nk-1) 1's (nk-1) 2's, ..., $(nk-1) |M_{j1}|$'s are distributed in the m' multisets $M_j \cap M_i$ for $1 \leq i \leq m'$. Again, by using a similar analysis as above, we obtain that $$\sum_{i=1}^{m'} |M_{j1} \cap M_i| \leq \left\lfloor \frac{nk-1}{k} \right\rfloor |M_{j1}| = (n-1)|M_{j1}| \quad (6)$$

Let $M_{j2}$ be the multiset such that $$|M_{j1} \cap M_{j2}| = \min_{1 \leq i \leq m'} |M_{j1} \cap M_i|$$

Then, we can similarly obtain $$m' \leq \frac{(n-1)|M_{j1}|}{|M_{j1} \cap M_{j2}|} \quad (7)$$

by noting that $|M_j \cap M_{j2}| > 0$.
In general, for $2 \leq y \leq x$, we have $$m' \leq \frac{(n-1)\left|\bigcap_{l=1}^{y-1} M_{jl}\right|}{\left|\bigcap_{l=1}^{y} M_{jl}\right|} \quad (8)$$

and $|\bigcap_{l=1}^{y} M_{jl}| > 0$ based on the assumption that the intersection of no more than x original multisets is nonempty.

On the other hand, also based on this assumption, we have m' multisets $(\bigcap_{l=1}^{x-1} M_{jl}) \cap M_i (1 \leq i \leq m')$ which are all non-empty. This means that $|(\bigcap_{l=1}^{x-1} M_{jl}) \cap M_i| \geq 1$ for $1 \leq i \leq m'$ and $$m' \leq \sum_{i=1}^{m'} \left|\left(\bigcap_{l=1}^{x-1} M_{jl}\right) \cap M_i\right|$$

Then, by using a similar argument as that in deriving (6), we can establish $$m' \leq (n-1)\left|\bigcap_{l=1}^{x-1} M_{jl}\right| \quad (9)$$

Finally, m' must be no more than the geometric mean of the right hand sides of (5), (8), and (9), and thus we obtain $$m' \leq (n-1)r^{\frac{1}{x}}$$

The immediate corollary of Theorem 1 is as follows.

In a Clos type k-source multicast network, for a new multicast connection request with fanout r', $1 \leq r' \leq r$, if there exist more than $(n-1)r^{1/x}, 1 \leq x \leq \min\{n-1, r\}$, available middle switches for this connection request, then there will always exist x middle stage switches through which this new connection request can be satisfied.

Accordingly, we can establish non-blocking conditions for the k-source multicast network as follows.

<Theorem 2>

A Clos type k-source N×N multicast network is non-blocking for any multicast assignments if $$m > \min_{1 \leq x \leq \min\{n-1, r\}} \left\{ \left\lfloor \left(n - \frac{1}{k}\right)x \right\rfloor + (n-1)r^{\frac{1}{x}} \right\} \quad (10)$$

The Proof of Theorem 2 is described hereinafter.

<Proof of Theorem 2>

Recall that the routing strategy for realizing multicast connections is to realize each multicast connection by using no more than x middle stage switches. By Corollary 1, if we have more than $(n-1)r^{1/x}$ available middle switches for a new multicast connection request, we can always choose x middle stage switches to realize this connection request.

The 'routing' means routing control for multicast connections in the multicast switching system of the first embodiment.

Now there may be at most nk−1 other input links each of which is used for a multicast connection. By the routing strategy, each of them is connected to no more than x links on different outputs of this input stage switch and then connected to no more than x middle stage switches. Notice that unlike a traditional network, in a multi-source multicast network, two links at different input ports can be connected to two links of the same output of an input stage switch and then connected to the same middle stage switch. Now, the number of middle stage switches, which are not available for a new multicast connection in the worst case, is acquired. Since each port has k links, if all the k links of the port connecting the current input stage switch to a middle stage switch are used by k existing multicast connections, this middle stage switch is not available. Therefore, we can have at most $$\left\lfloor \frac{(nk-1)x}{k} \right\rfloor = \left\lfloor \left(n - \frac{1}{k}\right)x \right\rfloor$$

middle stage switches, which are not available for a new multicast connection request. Thus, the total number of middle stage switches required, m, is greater than the number of unavailable middle switches in the worst case plus the maximum number of available middle switches needed to realize a multicast connection. The minimum value for m is obtained from (10) by refining the right hand side expression for all possible values of x.

The result for the more general network is Theorem 3 as shown below:

A Clos type k-source $N_1 \times N_2$ multicast network is non-blocking for any multicast assignments if $$m > \min_{1 \leq x \leq \min\{n_2-1, r_2\}} \left\{ \left\lfloor \left(n_1 - \frac{1}{k}\right)x \right\rfloor + (n_2 - 1)r_2^{\frac{1}{x}} \right\} \quad (11)$$

<Brief Description of Effects of First Embodiment>

According to the first embodiment, it is possible to reduce the number of the middle stage switches under non-blocking condition as much as possible, thereby providing the aforementioned network at low cost.

Second Embodiment

<Concept of Second Embodiment>

In a second embodiment, we will provide a system and a design method for the refinement of number of the middle stage switches for the network as described in the first embodiment.

<Configuration of Second Embodiment>

The second embodiment is a non-blocking multicast switching system and the design method thereof. The non-blocking multicast switching system of the second embodiment comprises three stages of an input stage, a middle stage, and an output stage, said respective stages comprising a plurality of switches capable of multicasting, wherein each switch of the input stage comprises at least $n_1$ input ports, each switch of the output stage comprises at least $n_2$ output ports, each switch of the input stage comprises at least one line connected to each of all switches of the middle stage, each switch of the middle stage comprises at least one line connected to each of all switches of the output stage, a signal of said each line is multiplexed k times at maximum, where $k \geq 1$, and in cases where x is a value satisfying (A1), number of switches of the output stage is $r_2$, maximum number of lines between the middle stage and the output stage is N', in which all channels in the respective lines are busy, N' is $(n_2-1)r_2$, and number of switches of the middle stage m'$_{refine}$ is obtained based on the Refining Algorithm in the following Table 1.

TABLE 1

```
Algorithm: Refinement
    Inputs:        n₂, r₂, x, m', N'
    Outputs: m_refine'; c₁, c₂, ..., c_x
begin
    01: mm' = m'; // initialization
    02: cc₁ = cc₂ = ... = cc_x = 0; // initialization
    03: while (cc_x == 0) {

04:
              cc₁ = ⌊ N'/mm' ⌋;

05:     for (i = 2; i ≦ x; i++){

06:
                cc_i = ⌊ (n₂ − 1) ∗ cc_{i−1} / mm' ⌋;

07:     }
    08:     if (cc_x == 0) {
    09:         m_refine' = mm'; // save the value
    10:         c₁ = cc₁; c₁ = cc₁; ... ; c_x = cc_x // save the values
    11:     }
    12:     mm' = mm' − 1;
    13: } //end while
end
```

The non-blocking multicast switching system of the second embodiment configures a Clos network having three stages of an input stage, a middle stage, and an output stage, comprising a plurality of switches. These components have been described in the first embodiment, so that the descriptions thereof are omitted.

In the non-blocking multicast switching system, each switch of the input stage comprises at least $n_1$ input ports, and each switch of the output stage comprises at least $n_2$ output ports. These components have been described in the first embodiment, so that the descriptions thereof are omitted.

In the multicast switching system, each switch of the input stage comprises at least one line connected to each of all switches of the middle stage, and each switch of the middle stage comprises at least one line connected to each of all switches of the output stage. These components have been described in the first embodiment, so that the descriptions thereof are omitted.

In the multicast switching system, a signal of said each line is multiplexed k times at maximum, where $k \geq 1$. This has been described in the first embodiment, so that the description thereof is omitted.

In the multicast switching system, in cases where x is a value satisfying (A1), number of switches of the output stage is $r_2$, maximum number of lines between the middle stage and the output stage is N', in which all channels in the respective lines are busy, N' is $(n_2-1)r_2$, and number of switches of the middle stage m'$_{refine}$ is obtained based on the Refining Algorithm in the above Table 1.

Therefore, in the multicast switching system, in cases where the minimum value of number of output ports of each switch in the output stage is $n_2$, the number of switches of the output stage is $r_2$, x fulfilling (A1) (indicating an upper limit value of number of the middle stage switches for one source due to system limitation), the number of switches in the middle stage m' required for implementing a non-blocking as described in the first embodiment, the maximum number of lines between the middle stage and the output stage is N', in which all channels in the respective lines are busy, the minimum value of the number of switches of the middle stage m'$_{refine}$ is obtained based on the Refining Algorithm in the above Table 1.

The 'maximum number of lines between the middle stage and the output stage is N', in which all channels in the respective lines are busy' is number of lines between the middle stage and the output stage, in which all channels in the respective lines are busy under the worst condition. Therefore, there is a possibility that $(n_2-1)r_2$ output lines of $n_2r_2$ output lines in the entire output stage are busy under the worst condition, and that $(n_2-1)r_2$ lines between the middle stage and the output stage are also busy under the worst condition, so that $(n_2-1)r_2$ indicates number of lines between the middle stage and the output stage, in which all channels in the respective lines are busy under the worst condition. If $n_2r_2$ lines are all busy, new connection request is not accepted, so that it does not correspond to the worst condition. Similarly, the case where $n_2$ lines of any switch in the output stage are all busy, it does not correspond to the worst condition.

Hereinafter, the description of the Refining Algorithm in the Table 1 is provided.

In Lines 01 and 02, initialization is executed. Therefore, mm' is variable indicating a candidate for m'$_{refine}$, and m' is assigned, and is initialized. The $cc_j$ (j=1, ..., x) is the cardinality of multiset when j middle stage switches are selected. (i.e., the number of output stage switches unreachable from the selected middle stage switch j as described in (8) of the first embodiment), and is initialized in Line 02. Lines 03 to 13 are main body of the Refining Algorithm, in which mm' (candidate of m' refine) can be reduced where $cc_x$=0. The '$cc_x$=0' indicates that if x middle stage switches are selected (x middle stage switches can be selected for one source), no output stage switches is unreachable from the middle stage switch (i.e., non-blocking is realized).

In Line 04, cardinality, in cases where one middle stage switch is selected, is calculated. Therefore, cardinality indicated by (5) in the first embodiment (denominator on the right-hand of (5)) is calculated.

In Lines 05 to 07, $cc_j$(j=2, ..., x) is calculated, and cardinality of multiset indicated by (8) in the first embodiment (denominator on the right-hand of (8)) is calculated.

In Lines 08 to 11, if $cc_x=0$ (i.e., non-blocking is realized), mm' is assigned as the candidate of m'$_{refine}$, and value is saved. Additionally, $cc_j(j=1, \ldots, x)$ is assigned as a system parameter $c_j(j=1, \ldots, x)$, and value is saved. In cases where mm'=m', based on Theorem 3 in the first embodiment, $cc_x=0$ (i.e., non-blocking is realized), so that the value is always saved.

In Line 12, mm' is decremented, and operations in Lines 03 to 12 are repeated. Therefore, even if mm' is decremented, m' refine and candidate for system parameter $c_j$ are saved as long as $cc_x=0$ (i.e., non-blocking is realized). If it is determined that $cc_x$ is not 0 (i.e., non-blocking is not realized) in Line 08 after mm' is decremented in Line 12, m' refine and candidate for system parameter $c_j$ are not saved, and in Line 03, operation escapes from 'while' loop and is terminated. The minimum value m'$_{refine}$ for realizing non-blocking and a system parameter $c_j(j=1, \ldots, x)$ at the point are acquired.

<Detailed Description of the Refining Algorithm>

In the first embodiment, we have performed the initial analysis and obtained tentative designs for multi-source non-blocking multicast switching networks. Notice that the theoretical bound in Theorems 1, 2, and 3 are based on the optimization on real functions, which provides an asymptotic closed form bound for the number of available middle stage switches. When considering the fact that the cardinality of each destination multiset is an integer, we can have the following refinement, which further reduces the network cost.

Hereinafter, the detailed description of the refinement of the number of the middle stage switches in the k-source multicast network with parameters (N=160, n=8, r=20, k=5) is provided.

The 'N' is number of all ports in the input stage or number of all ports in the output stage. The 'n' is number of ports in each switch in the input stage or in the output stage. The 'r' is number of switches in the input stage or in the output stage. The 'k' is multiplicity for each line (signal line connected to each port), therefore, available number of channels for each line.

For a given k-source multicast network with parameters

N=160, n=8, r=20, k=5, by using Theorem 2 we can calculate x=3, m=43, and the bound on the number of available middle switches (m') is $$m' = \lceil (n-1)r^{\frac{1}{x}} \rceil = \lceil 7*20^{\frac{1}{3}} \rceil = \lceil 19.000923 \ldots \rceil = 20$$

In the above, $\lceil \ \rceil$ is a ceiling function, and indicates a minimum integral, which is not below a value in $\lceil \ \rceil$.

We first verify that any new multicast connection request can be realized by using x(=3) middle stage switches among given m'=20 available middle stage switches. According to (5), the first chosen middle stage switch $j_1$ satisfies $$|M_{j_1}| \leq \left\lfloor \frac{(n-1)r}{m'} \right\rfloor = \left\lfloor \frac{7*20}{20} \right\rfloor = 7;$$

according to (7), the second chosen middle stage switch $j_2$ satisfies $$|M_{j_1} \cap M_{j_2}| \leq \left\lfloor \frac{(n-1)|M_{j_1}|}{m'} \right\rfloor \leq \left\lfloor \frac{7*7}{20} \right\rfloor = \lfloor 2.45 \rfloor = 2;$$

and finally, the third chosen middle stage switch $j_3$ satisfies $$|M_{j_1} \cap M_{j_2} \cap M_{j_3}| \leq \left\lfloor \frac{(n-1)|M_{j_1} \cap M_{j_2}|}{m'} \right\rfloor \leq \left\lfloor \frac{7*2}{20} \right\rfloor = \lfloor 0.7 \rfloor = 0.$$

Thus, we have $M_{j_1} \cap M_{j_2} \cap M_{j_3} = \phi$. That is, any multicast connection request can be realized by the three middle stage switches $j_1$, $j_2$ and $j_3$ chosen from m'=20 available middle stage switches. Since the bound calculated for m' in the first embodiment is based on real functions, the actual bound may be slightly smaller. In this specific case, it can be verified that m'=18 instead of m'=20 is the smallest m' which guarantees that any new multicast connection request can be realized by at most x(=3) middle stage switches. The justification is given below. For the first chosen middle stage switch $j_1$, $$|M_{j_1}| \leq \left\lfloor \frac{(n-1)r}{m'} \right\rfloor = \left\lfloor \frac{7*20}{18} \right\rfloor = \lfloor 7.777 \ldots \rfloor = 7;$$

for the second chosen middle stage switch $j_2$, $$|M_{j_1} \cap M_{j_2}| \leq \left\lfloor \frac{(n-1)|M_{j_1}|}{m'} \right\rfloor \leq \left\lfloor \frac{7*7}{18} \right\rfloor = \lfloor 2.722 \ldots \rfloor = 2;$$

and for the third chosen middle stage switch $j_3$, $$|M_{j_1} \cap M_{j_2} \cap M_{j_3}| \leq \left\lfloor \frac{(n-1)|M_{j_1} \cap M_{j_2}|}{m'} \right\rfloor \leq \left\lfloor \frac{7*2}{18} \right\rfloor = \lfloor 0.777 \ldots \rfloor = 0$$

Thus, x(=3) middle stage switches are sufficient to realize any multicast connection for m'=18. On the other hand, to see m'=18 is the smallest, we show that it is impossible to realize any multicast connection when m'=17. For the first chosen middle stage switch $j_1$, $$|M_{j_1}| \leq \left\lfloor \frac{(n-1)r}{m'} \right\rfloor = \left\lfloor \frac{7*20}{17} \right\rfloor = \lfloor 8.235 \ldots \rfloor = 8;$$

for the second chosen middle stage switch $j_2$, $$|M_{j_1} \cap M_{j_2}| \leq \left\lfloor \frac{(n-1)|M_{j_1}|}{m'} \right\rfloor \leq \left\lfloor \frac{7*8}{17} \right\rfloor = \lfloor 3.294 \ldots \rfloor = 3;$$

and for the third chosen middle stage switch $j_3$, $$|M_{j_1} \cap M_{j_2} \cap M_{j_3}| \leq \left\lfloor \frac{(n-1)|M_{j_1} \cap M_{j_2}|}{m'} \right\rfloor \leq \left\lfloor \frac{7*3}{17} \right\rfloor = \lfloor 1.235 \ldots \rfloor = 1.$$

We can see that we may have the case that $M_{j_1} \cap M_{j_2} \cap M_{j_3} \cap \phi$; that is, x(=3) middle stage switches may not be sufficient to realize all possible multicast connections. Therefore, we have proved that m'=18 is the smallest. Thus, the configuration can be refined to n=8, r=20, N=160, k=5, x=3 and m=41

Notice that the bounds on the minimum cardinalities of the intersected destination multisets in x(=3) steps for the minimum m'=18 are $c_1=7$ $c_2=2$, $c_3=0$ In general, let the bounds on the minimum cardinalities of the intersected destination multisets in x steps for the minimum m' be $$c_1, c_2, \ldots, c_x \quad (12)$$

Hereinafter, the refining algorithm for an $N_1 \times N_2$ network is provided.

As shown in Table (1), the network parameters $n_1, r_1, n_2$ and $r_2$, the chosen x, an initial m' value (e.g. it can be chosen as $(n_2-1)r_2^{1/X}$), and N' that is the maximum number of elements distributed in middle stage switches (e.g. $(n_2-1)r_2$) are inputted. The outputs of the algorithm are the refined $m'_{refine}$ and the system parameters in (12).

Finally, the refined m is $$m = \left\lfloor \left(n_1 - \frac{1}{x}\right)x \right\rfloor + m'_{refine}.$$

according to Theorem 3.

Notice that the refining approach is suitable for k-source three-stage multicast networks for any k≧1 that includes the ordinary multicast networks when k=1.

<Brief Description of Effects of Second Embodiment>

According to the second embodiment, the refinement of number of the middle stage switches under non-blocking condition is provided, thereby providing the aforementioned network at low cost.

Third Embodiment

<Concept of Third Embodiment>

In a third embodiment, in addition to the second embodiment, we will provide a routing algorithm for adding/deleting a multicast connection to or from the existing multicast tree without loss of data. The 'multicast tree' is a tree in the system, which is used for target source.

<Configuration of Third Embodiment>

The multicast switching system of a third embodiment is based on the first or second embodiment. For example, as shown in FIG. 4, the non-blocking multicast switching system of the third embodiment comprises a controller controlling the switch by handling the Cases in the following order. Case 1: If a new output channel is in one of the existing output stage switches of the tree, a connection is established in the output stage switch; Case 2: Not Case 1, and if the output stage switch that the new output channel is in is reachable from an idle channel in an output port of one of the existing middle stage switches, a connection is made in the middle stage switch, thereby making a connection from the idle channel; Case 3: Not Cases 1 and 2, and if the existing multicast tree has used less than x (an upper limit value of number of the middle stage switches for one source due to system limitation) middle stage switches, an available middle stage switch, which has an idle output port channel and an idle input port channel, is not included the multicast tree, and leads to (via an interstage link) the output stage switch, is selected, thereby making a connection.

The controller of the multicast switching system of the third embodiment controls the switch by handling the Cases in the following order (FIGS. 4(a), (b) and (c)).

The order of control by the controller is described hereinafter. Here, the control of each switch may be executed by address control or packet control.

Case 1: If a new output channel is in one of the existing output stage switches of the tree, a connection is established in the output stage switch (FIG. 4(a)).

Therefore, in cases where it is required to make a new output channel from the output stage switch, if the channel can be provided in the switch, it is enough to make a connection in the output stage switch.

Case 2: Not Case 1, and if the output stage switch that the new output channel is in is reachable from an idle channel in an output port of one of the existing middle stage switches, a connection is made in the middle stage switch, thereby making a connection from the idle channel (FIG. 4(b)).

Therefore, in cases where it is required to make a new output channel from the output stage switch, if the channel cannot be provided in the switch, but can be provided from a middle stage switch (the middle stage switch has an idle output port), a connection to the idle output port can be made in the middle stage switch, and connection from the output port to the target output stage switch can be made.

Case 3: Not Cases 1 and 2, and if the existing multicast tree has used less than x (an upper limit value of number of the middle stage switches for one source due to system limitation) middle stage switches, an available middle stage switch, which has an idle output port channel and an idle input port channel, is not included the multicast tree, and leads to (via an interstage link) the output stage switch, is selected, thereby making a connection (FIG. 4(c)).

Therefore, in cases where it is required to make a new output channel from the output stage switch, if the channel cannot be provided in the switch or from other middle stage switches, but can be provided from an input stage switch (if the multicast tree of the switch has used less than x middle stage switches), non-blocking is surely made, so that it is possible to make a connection to the target output stage switch by selecting an appropriate middle stage switch. The appropriate middle stage switch corresponds to a switch, which has an idle output port channel and an idle input port channel, and is not included the multicast tree.

<Detailed Description of the Routing Algorithm for Adding/Deleting a Multicast Connection>

In the third embodiment, we present the routing algorithm for multi-source non-blocking multicast switching networks. Compared to the single-source multicast routing algorithm, the main challenges and differences are as follows.

Therefore, we are considering adding/deleting a single multicast branch to/from an existing multicast tree, and we need to deal with the situation that two adjacent switch modules have multiple interstage links.

<Terminologies for the Routing Algorithm>

Before we present the routing algorithm, we give some related terminologies. Notice that all entities described in the following are in terms of the logical layout of the switching network, not the physical layout. Therefore, we simply refer to a switch module as a switch.

A channel (or a link) in a three-stage multi-source multicast switching network can be described as a 5-tuple.

$$\langle \text{Stage}, \text{InOut}, \text{Switch\#}, \text{Port}, \text{Channel\#} \rangle \quad (13)$$

where Stage takes one of the values in set {IN, MID, OUT} representing which stage is referred to; InOut takes one of the values in set {IN, OUT} representing which side of the switch this channel is in; Switch# is the switch number in the stage; Port# is the port number in the switch; and Channel# is the channel number (between 0 and k−1) in the port. We may refer to an input channel of the network as <Switch#, Port#, Channel#>, which is in fact <IN, IN, Switch#, Port#, Channel#>; and similarly an output channel <Switch#, Port#, Channel#>, which actually means <OUT, OUT, Switch#, Port#, Channel#>. A multicast address is defined as a set of output channels.

$$\{OutputChannel_1, OutputChannel_2, \ldots, OutputChannel_j\} \quad (14)$$

However, sometimes we may only be interested in the switches in the output stage (when reaching to the output stage switch, output is possible from any port/channel), thus a multicast address can also be expressed in terms of output stage switch labels (identifier).

$$McastAdress \subseteq \{0,1,\ldots,r-1\} \quad (15)$$

A multicast connection request is defined as a pair of an input channel and a multicast address as $$\langle Inputchannel, Multicastaddress \rangle \quad (16)$$

Multicast routing for a given multicast connection request is to build a multicast tree by setting up connections on some selected switches. The selected switches consist of one input stage switch that the input channel is in, some selected middle stage switches, and all the output stage switches involved in the multicast address. Normally, the switch setting inside a switch is typically a one-to-many connection from a channel of an input port to a set of channels of different output ports in this switch. For some output stage switch, more than one channels may be in the same output port, as required by a particular multicast connection request. For a one-to-many connection in the switch, we call the input channel of the switch 'local input channel', and the set of output channels of the switch 'local multicast address'. A one-to-many connection in a switch as part of the multicast tree is denoted as $$LocalInputChannel \rightarrow LocalMulticastAddress \quad (17)$$

In addition, the fixed interstage connections in a multi-source Clos type multistage network enforce some channels between switches of the adjacent stages to be connected (or, equivalent.) In fact, we have $$\langle IN,OUT,w,p, channel\#\rangle == \langle MID,IN,p,w,channel\#\rangle$$

$$\langle MID,OUT,p,w,channel\#\rangle == \langle OUT,IN,w,p,channel\#\rangle \quad (18)$$

Thus, the multicast connection request can be realized in the switching network by a multicast tree constructed by a set of one-to-many connections as shown in (17) in selected switches and the fixed interstage linkages as shown in (18). Clearly, among the selected middle stage switches, no two of them lead to the same output switch in the multicast tree. Notice that any connection in a multicast tree cannot share a channel with other multicast trees in any switch so that there is no conflict among different multicast trees. For convenience, the local multicast address of a one-to-many connection (17) in an input stage switch can also expressed as a set of middle stage switch labels (identifiers).

$$InLocMcastAddr \subseteq \{0,1 \ldots m-1\}$$

and the local multicast address in a middle stage switch can also be expressed as a set of output stage switch labels (identifiers) as $$(19) \quad MidLocMcastAddr \subseteq \{0,1,\ldots,r-1\}$$

The destination multiset for a middle stage switch defined in the second embodiment $$M_j = \{0^{j_0}, 1^{j_1}, \ldots, (r-1)^{j_{r-1}}\} \quad (20)$$

is still useful in describing the routing algorithm. Also, for describing adding/deleting a connection in a middle stage switch, we define the operations of "+" and "−" of a multiset $M_j$ and an ordinary set V based on set $\{0, 1, \ldots, r-1\}$ as $$M_j \pm V = \{0^{j_0 \pm v_0}, 1^{j_1 \pm v_1}, \ldots, (r-1)^{j_{r-1} \pm v_{r-1}}\} \quad (21)$$

The resulting multiset of (21) becomes illegal if there is some multiplicity being <0 or >k.

<Example of Adding/Deleting Multisource Network>

In general, there are two types of multicast connection requests, input-based multicast routing and output-based multicast routing. An input-based multicast connection request is to build a new multicast tree from an input link of the network. When requesting to delete the multicast connection, we drop the entire tree rooted at the input link. The routing algorithm in document 4 can be used to serve this purpose.

In output-based multicast routing, when requesting to add, we add a branch from an output link to the existing multicast tree; when requesting to delete, we remove a branch attached to an output link of the network from the multicast tree.

Clearly, the deletion operation does not violate the non-blocking routing strategy since the number of middle stage switches for the multicast tree could not increase. Therefore, for the deletion operation in a multi-source network, we can simply delete the tree branch from the output channel towards the input side of the network until reaching a tree node that has another branch towards other output channels.

In the rest of the disclosure, we focus on the add operation. As will be seen in the following routing algorithm sketch, since each time we only add one branch, we have a good chance not to violate the non-blocking routing strategy, and can make a simple connection in most cases.

The routing algorithm can be outlined by handling the cases in the following order.

Case 1: If the new output channel is in one of the existing output stage switches of the tree, then we simply make a connection in this output stage switch from the channel of the input port of the switch in the multicast tree to this output channel; then we are done (see the example in FIG. 4(a));

Case 2: If the output stage switch that the new output channel is in is reachable from an idle channel in an output port of one of the existing middle stage switches, then we make a connection in this middle stage switch so that the multicast tree is expanded to that idle channel; since the tree expands via an interstage link from this channel of the middle stage switch to the output stage switch, we finally make a connection in the output stage switch as in Case 1; then we are done as shown in FIG. 4(b);

Case 3: If the existing multicast tree has used less than x (a predefined value) middle stage switches, we can select an available middle stage switch that has an idle output port channel leading to (via an interstage link) this output stage switch (such a middle stage switch must exist since non-blocking is ensured).

<Brief Description of Effects of Third Embodiment>

In the third embodiment, in addition to effects of the above embodiments, according to the routing algorithm for adding/deleting a connection to the existing multicast tree without loss of data, it is possible to operate the network in the non-blocking condition without loss of data.

Fourth Embodiment

<Concept of Fourth Embodiment>

In a fourth embodiment, in addition to the above embodiments, we provide the routing algorithm for adding/deleting a connection to the existing multicast tree without loss of data even if number of occupied middle stage switches in the existing multicast tree has already reached x.

<Configuration of Fourth Embodiment>

The multicast switching system of the fourth embodiment is based on the first or second embodiment. The multicast switching system of the fourth embodiment comprises a controller for controlling a connection between the switch outputting source of the input stage and the middle stage switch selected base on the Routing Algorithm in Table 2.

TABLE 2

Algorithm: BuildNewMcastTree

Inputs:
    < ic1,McastAddr$_{new}$ >; // ic1: new mcast con. request, McastAddr: a set of output stage switches
    A = {0,1,...,m' − 1}; // set of available middle stage switches for new mcast. con. request
    $M_0, M_1, ..., M_{m'-1}$; // destination multisets, including existing tree rooted at i$$
    $F_{exist} = \{i_1, i_2, ..., i_x\} \subset A$; // set of middle stage switches on existing mcast tree
    $LM_{i_1}, LM_{i_2}, ..., LM_{i_x}$; // set of local mcast. addresses in $F_{exist}$ in terms of output stage switches
    $c_1, c_2, ..., c_x$; // system parameters: bounds on minimum cardinalities
Outputs:
    $F_{new} \subset A$; // set of selected middle stage switches for new mcast tree
    $LM_{new,i}$ for i ∈ $F_{new}$; // local mcast addresses for selected middle switches
begin
  01: for q ∈ A, let $W_q = M_q − LM_q$ if q ∈ $F_{exist}$; $W_q = M_q$ otherwise;
  02: for q ∈ A, let $V_q = \{i | i^k \in W_q\}$; // set of output switches not reachable from middle switch q
main-function( )
{
  03:    MASK = McastAddr$_{new}$; // a set of output switches
  04:    $F_{new}$ = { }; // initialized as an empty set
  05:    for (j = 1; j ≦ x; j++) {
  06:      if (MASK == ϕ)
  07:        break;
  08:      p = select($c_j$, MASK); // find a middle switch
  09:      A = A − {p}; // update the set of available middle stage switches
  10:      $F_{new} = F_{new} \cup \{p\}$; // add p as a new selected middle stage switch
  11:      $LM_{new,p}$ = MASK − $V_p$; // new local mcast address in middle switch p
  12:      MASK = MASK ∩ $V_p$; // update MASK
  13:    } // end-for
} // end main-function
int select($c_j$, MASK)
{
  14:    let S = {q | |$V_q$ ∩ MASK| ≦ $c_j$, q ∈ $F_{exist}$}; // check middle switches in existing mcast tree
  15:    if (S ≠ ϕ) {
  16:      find p such that |MASK − $V_p$ − $LM_p$| = $\min_{q \in S}$ |MASK − $V_q$ − $LM_q$|; // see (22)
  17:      $F_{exist} = F_{exist} − \{p\}$; // update $F_{exist}$
  18:      return p;
  19:    } else { // cannot select a proper middle switch in existing tree
  20:      find any p ∈ A such that |$V_p$ ∩ MASK| ≦ $c_j$;
  21:      return p;
  22:    } // end if-else
} // end select
end The controller controls a connection between the switch outputting source of the input stage and the middle stage switch selected base on the Routing Algorithm in Table 2.

The Routing Algorithm makes a new multicast tree based on the existing multicast tree with the same root, and is used in the case where the number of occupied middle stage switches in the existing multicast tree has already reached x (FIG. 4(d)).

The detailed description of the Routing Algorithm implemented by the controller is provided hereinafter. Here, the control of each switch may be executed by address control or packet control.

The input to the algorithm is the new multicast connection request with 'McastAddr$_{new}$', in terms of a set of output stage switches, the set of available middle switches (including the middle stage switches of the existing multicast tree at the same root) for the new connection request, their destination multisets, the set of middle stage switches in the existing multicast tree, and the local multicast addresses of one-to-many connections in these middle stage switches in the existing multicast tree. The output of the algorithm is a set of selected middle stage switches for the new multicast tree, and the local multicast addresses of one-to-many connections in the selected middle stage switches in the new multicast tree.

Since we assume that the routing algorithm is for the non-trivial case, which implies that the number of middle stage switches for the existing multicast tree with the same root is already x, set $F_{exist}$ is thus denoted as $\{i_1, i_2, \ldots, i_x\}$. In the initialization, $W_q$ is defined as multiset $M_q$-$LM_q$ or $M_q$ (by using operation (21)) for $F_{exist}$ or simply $M_q$ for $F_{exist}$; and $V_q$ is defined as a set of output stage switches with no idle links from middle stage switch q.

In the main function of the algorithm, set MASK is initially assignedMcastAddrnew. It takes at most x iterations based on system parameters$c_1, c_2, \ldots, c_x$ given earlier. In each iteration, it calls select($c_j$,MASK) to choose a middle stage switch p for the new multicast tree (and stores p in$F_{new}$), then generates local multicast address$LM_{new,p}$, a set of output stage switches, of the one-to-many connection in middle stage switch p in the new tree, and finally updates variables MASK, etc.

In function select($c_j$, MASK), it first checks whether there is any middle stage switch q in the existing multicast tree such that $|V_q \cap MASK| \leq c_j$. If there are multiple such switches, it returns the one with the minimum value as specified in (22). If no such switch, it returns a middle stage switch p that satisfies $|V_p \cap MASK| \leq c_j$.

Hereinafter, the description and proof of the routing algorithm is provided.

<Description and Proof of the Routing Algorithm>

As described in the fourth embodiment, in the worst case that the existing multicast tree has already used x middle stage switches, we do need to change the existing multicast tree so that we can ensure that at most x middle stage switches are used. Fortunately, we can make non-interruptive changes such that no conflicting data are sent and no packets are lost.

<Properties of Overlapped Multi-source Multicast Trees>

We consider two multicast trees that have the same input channel as their root and at least partially overlapped (between new and old trees) multicast addresses. The second (new) tree is independently determined as if the first (old) tree were released (deleted), however, we assume that the two trees are co-existing in the network at this moment. Thus, besides the overlapped branches, the two trees may have conflicts at some channels. In particular, two types of channel merges ("conflicts") are possible. When two channels (as two branches of the two trees) on the same input port of a switch merge to a channel of an output port of this switch, we call it a branch merge at channel level. When two channels (as two branches of the two trees) on two different input ports of a switch merge to a channel of an output port of this switch, we call it a branch merge at switch level. The following theorem describes all possible overlapping cases for these two independently determined multicast trees with the same root.

<Theorem 4>

In a Clos type three stage multi-source multicast network satisfying the non-blocking condition in Theorem 2 or 3, for the two independently determined multicast trees from the same input channel to two overlapped multicast addresses, they do not overlap with multicast trees rooted at other input channels of the switch. On the other hand, the two trees may share some tree branches (i.e., the connections in a switch) in the input stage switch, middle stage switches, and/or output stage switches; the two trees may have a branch merge at channel level in middle stage switches and/or output stage switches, and may have a branch merge at switch level in output stage switches.

<Proof of Theorem 4>

Since each of the two multicast trees rooted at the same input channel is determined by at most x middle stage switches from $m'=m-[(n_1-1/k)x]$ available middle stage switches, by Theorem 2 or 3, each of them does not have any conflict with other (at most) $n_1k-1$ multicast trees rooted at other different input channels of the switch.

On the other hand, consider paths starting from the same input channel towards some common output channels of the network in the two trees. The two trees may share tree branches (i.e., the connections in a switch) in the input stage switch, middle stage switches, and/or output stage switches. In the connections of the input stage switch, since there is only one input channel for the two trees, it is impossible for two channels (as two branches of the two trees) of the input port to merge to a channel of an output port of this input stage switch. However, such a branch merge at channel level may occur at some middle stage switches and/or output stage switches shared by both multicast trees. Also, in the connections of a middle stage switch, since the tree branches of the two trees come from the same input stage switch, it is impossible for two channels of two different input ports of this middle stage switch (as two branches of the two trees) that come from two input stage switches merge to a channel of this middle stage switch. Such a branch merge at switch level is also impossible for the input stage switch. However, it is possible for some output stage switches. See FIG. 5 for examples of various cases.

FIG. 5 is an illustration of two overlapped multicast trees for multicast connection request $<ic_1, \{oc_1, oc_2, oc_3, oc_4\}>$: light solid lines are tree branches only for the first multicast tree, the dashed lines are only for the second (after change) multicast tree, and heavy solid lines are shared (between new and old) tree branches, e.g. those from $ic_1$ to $oc_1$. Also, "A" and "B" are the points of the branch merge (in from the same port with different channel and out from the same port) at channel level in the middle stage switch and the output stage switch, respectively; "C" is the point of the branch merge (in from different ports and out from the same port) at switch level.

We now applying Theorem 4 to the case that given an existing multicast tree for multicast connection<InChannel, McastAddr$_1$> in the network, add a new multicast connection branch with output channel$oc_{new}$ to the multicast address so that the new multicast address becomes McastAddr$_2$=McastAddr$_1 \cap \{oc_{new}\}$. Clearly, according to the non-blocking condition in Theorem 2 or 3, the new multicast tree can be constructed by ignoring the existing multicast tree with the same input channel as the root. That is, the new multicast tree will never conflict with any other existing multicast trees with different roots. Clearly, the newly built tree may have some "conflicts" with the existing tree with the same root as detailed in Theorem 4. This type of "conflicts" essentially would not cause data loss or mixed up as the existing tree and the new multicast tree are sending the same data.

In circuit switching (of the conventional technology), when given the circuit with merging capability, we can first add the new connection paths momentarily (by Theorem 2 or 3, m' available middle stage switches can hold two x-sets of middle stage switches (may have some overlaps) for the two multicast trees) to provide non-interruptive data transmission, and then release the old multicast tree. Finally, the new multicast tree that realizes the new multicast connection request using at most x middle stage switches can guarantee the non-blocking condition for future multicast requests in the network.

In packet switching as in this embodiment, a proper setting for the routing table in each switch can do the similar job effectively.

Theoretically, the basic routing algorithm in the first or second embodiment (i.e., the entire multicast tree is remade) can be used here. However, for the operation of adding a multicast branch to an existing multicast tree, we prefer to keep original connections unchanged as much as possible. We now analyze all different cases described in Theorem 4 to see how we can meet this goal. Clearly, in the case of the two trees sharing some branches, we can keep the original setting of the existing tree for these branches. In the case of a branch merge at channel level, we still can use the original setting (as shown in the path from $ic_1$ to A and the path from $ic_1$ to B in FIG. 5), because the original setting and the new setting lead to the same switch in the next stage. However, in the case of a branch merge at switch level, we have to exchange the branches between the existing tree and the new tree.

The key step of multicast routing is to select up to x middle stage switches, which can be reached from the input channel and can connect to the output stage switches of the multicast address. In the following, we will develop a routing algorithm to generate a new multicast tree that utilizes branches from the existing multicast tree as much as possible, and keeps branch merges at switch level as few as possible. We first explore some useful properties to achieve these goals.

For a given network, we have system parameters $c_1$, $c_2, \ldots, c_x$ as the bounds on the minimum cardinalities of the chosen intersected destination multisets for at most x selection steps, respectively. An example of such bounds is shown in (12). Based on the previous description in the second embodiment, in step i, any middle stage switch whose intersection with i−1 previously selected middle stage switches has a cardinality no more than $c_i$ can be selected. Note that we do not need to select the middle stage switch with the minimum cardinality. This gives us more choices than the conventional algorithm. In this case, among the candidates of such middle stage switches, we prefer to select a middle stage switch that is already in the existing multicast tree with the same root so that we can utilize the existing settings in the switch to achieve our first goal.

Another benefit of selecting the middle stage switch shared with the existing tree is to reduce the branch merge at switch level, which is our second goal. In FIG. 5, if we first choose middle stage switch $MW_1$, the existing branch can cover both $oc_1$ and $oc_2$ in output stage switch $OW_1$, then when we choose middle switch $MW_3$ later, it does not need to cover $OW_1$ again, and thus the branch merge at switch level at point "C" would not occur.

On the other hand, let's examine the possible drawback of choosing such a middle stage switch. As can be seen in another example shown in FIG. 5, if we choose middle stage switch $MW_2$, which has an existing connection with local multicast address $LM_2=\{OW_3, OW_4\}$, the new connection yields the new local multicast address $LM_{new,2}=\{OW_2,OW_3, OW_4\}$, and thus it would cause branch merges at switch level at $OC_2$ and $OC_3$ in output stage switch $OW_2$ later. Therefore, if we have multiple candidate middle stage switches that are in the existing multicast tree with the same root, the priority for the selection would be to select a middle stage switch that achieves $$\min_q |LM_{new,q} - LM_q| \qquad (22)$$

so that we can reduce the number of branch merges at switch level. Of course, in the above example, since $MW_2$ is the only such middle switch, we have to choose it.

FIG. 6 is another example of two overlapped multicast trees for connection requests. The light solid lines are branches existing only in a multicast tree for the first connection request $<ic_1, \{OC_1, OC_2, \ldots, OC_6\}>$, the dashed lines are branches existing only in a multicast tree for the second connection request $<ic_1, \{OC_1, OC_2, \ldots, OC_6, OC_7\}>$, and the heavy solid lines are branches shared by both multicast trees.

<Channel Level Implementation of the Routing Algorithm>

The algorithm outlined in the previous description generates a set of switches in the new multicast tree, and one-to-many connections at port level for each switch. In this section, we discuss how to implement the routing algorithm at channel level, i.e. how to identify and keep the shared branches at channel level of the existing tree and the new tree; how to identify and drop the branches that only belong to the existing tree; how to identify and add a branch (and how to assign a channel) that only belongs to the new tree; and how to change connections (drop and add simultaneously) in a switch that is on both existing and new trees. The implementation of adding and deleting routing algorithm in this section is actually to update switch routing tables so that the connections of the existing tree are changed to those of the new tree. A routing table of a switch module is a set of one-to-many connections in the form of (17).

The one-to-many connections in the form of (17) can be expressed as $$\langle ip_1, ic_1 \rangle \rightarrow \{\langle op_1, oc_1 \rangle, \langle op_2, oc_2 \rangle, \ldots, \langle op_f, oc_f \rangle\} \qquad (23)$$

where $ip_1$ and $op_1$ stand for the input port and output port of the switch, respectively, and $ic_1$ and $oc_1$ stand for the input channel and output channel of the port, respectively. It should be pointed out that for connections of the existing tree, the channels are known, however, for those of the new tree, the channels are to be determined except for the input channel, and the output channels of the network specified in the new multicast connection request.

<Identifying Target Switches for Algorithm and the Operations>

Let $SW_{exist}$ and $SW_{new}$ are sets of switches of the existing tree and the new tree respectively. Clearly, for any switch in $SW_{exist} - SW_{new}$, we need to perform a deletion operation only; for any switch in $SW_{new} - SW_{exist}$, we need to perform an add operation only. However, for any switch in $SW_{new} \cap SW_{exist}$, the operations need to be performed depend on the connections in this switch for the existing tree and the new tree. We call this type of operations mixed operations and will discuss them in more detail in the following description on mixed operations.

<Deletion Operation Only>

For the switch that needs to perform a deletion operation only, it has one and only one one-to-many connection in the form of (23) for the existing tree. We can simply remove it from the routing table of this switch. An example of this case is $MW_1$ in FIG. 6

<Add Operation Only>

For the switch that needs to perform an add operation only, it actually is part of the new tree. Thus we know the one-to-many connection at port level, but we need to determine the corresponding channels, i.e. (23) can be written as $$\langle ip_1, ic_1(?) \rangle \rightarrow \{\langle op_1, oc_1(?) \rangle, \langle op_2, oc_2(?) \rangle, \ldots ,$$
$$\langle op_f, oc_f(?) \rangle\}$$

where "(?)" means that the channel number is to be determined. Clearly, if the switch is in the output stage, channel $oc_i$ is determined by the detailed multicast address of the new multicast connection request; otherwise, channel $oc_i$ of the corresponding output port of the switch can be assigned any idle channel on this port (the idle channel must exist based on the algorithm in the last section). The remaining is to determine channel $ic_i$. If this switch is in the input stage, $ic_i$ must be the input channel of the connection request. Otherwise, we can trace back on the new tree to the previous stage. In fact, by using (18), we can find the switch number and output port number of the previous stage, which are unique in the new multicast tree and the channel has been determined earlier. Thus, by using (18) again, we can let $ic_i$ 1 be the channel in the previous stage. Examples of this case are $MW_3$ and $OW_5$ in FIG. 6.

<Mixed Operations>

In cases where the switch is included in both the existing tree and the new tree, we need to find the difference of their one-to-many connections in this switch on the two trees. As indicated by Theorem 4, in general, the one-to-many connections of the existing tree and the new tree at port level share an input port of the switch, and thus we can let channel $ic_1$ of the new tree be the same as the existing tree (to avoid branch merges at channel level); only in an output stage switch, the two one-to-many connections may have different input ports on this switch. We have following different cases depending on the relationship between the new subtree and the existing subtree in the switch. Note that in the following mixed operations 1 to 4 are for cases where the one-to-many connections of the existing tree and the new tree share the same input port on the switch, while in the following mixed operation 5 is for the case in which the one-to-many connections use two different input ports on the switch.

<Mixed Operation 1: New Subtree=Existing Subtree>

In the case, the one-to-many connections of this switch for the existing tree and the new tree are the same (at port level for the switch in the input stage or middle stage, and at output channel level for the switch in the output stage). The one-to-many connections (at channel level) of this switch for the existing tree can be used by the new tree directly. Thus nothing needs to be done. Examples of this case are $OW_3$ and $OW_4$ in FIG. 6.

<Mixed Operation 2: New Subtree ⊂ Existing Subtree>

In this case, the one-to-many connections of the existing tree and the new tree at port level share an input port of the switch, but the local multicast address of the new tree is only a subset of the local multicast address of the existing tree. Therefore, we change the one-to-many connection (23) of the routing table for the existing tree by simply drop the unwanted local multicast address for the new tree. For example, if $<op_1,oc_1>,<op_2,oc_2>$ are not in the new tree, the connection (23) is modified to $$\langle ip_1,ic_1\rangle \rightarrow \{\langle op_3,oc_3\rangle,\ldots,\langle op_j,oc_j\rangle\}$$

in the routing table.

<Mixed Operation 3: New Subtree ⊃ Existing Subtree>

In this case, the one-to-many connections of the existing tree and the new tree at port level share an input port of the switch, but the local multicast address of the new tree is a superset of the local multicast address of the existing tree. We simply add some local multicast address to (23). It is similar to the above case <Add Operation Only>, but here we do not need to determine $ic_1$, as it is already in use. An example of this case is $MW_2$ in FIG. 6.

<Mixed Operation 4: New Subtree≠Existing Subtree>

In this case, again the one-to-many connections of the existing tree and the new tree at port level share an input port of the switch, but there are some $<op_i,oc_i(?)>$ in the new tree that are not in the existing tree, and some $<op_j,oc_j>$ in the existing tree that are not in the new tree. We can modify the local multicast address in (23) to that for the new tree. An example of this case is $IW_1$ in FIG. 6. We may also have the special case of no shared branch in this switch for the two trees.

<Mixed Operation 5: New Subtree and Existing Subtree not Sharing an Input Port of the Switch>

In this case, the one-to-many connections of the existing tree and the new tree use different input ports of the switch. It is a branch merge at switch level, and occurs only in the output stage switch as stated in Theorem 4. What we need to do in the routing table is to drop the one-to-many connection for the existing tree as in the above case <Deletion Operation Only>, and simultaneously add the one-to-many connection for the new tree as in another above case <Add Operation Only>. Examples of this case are $OW_1$ and $OW_2$ in FIG. 6.

The output-based routing algorithm is suitable for k-source three-stage multicast networks for any k≧1 that includes the ordinary multicast networks in the case of k=1.

<Brief Description of Effects of Fourth Embodiment>

In the fourth embodiment, in addition to effects of the above embodiments, according to the routing algorithm for adding/deleting a connection to the existing multicast tree without loss of data, it is possible to operate the network in the non-blocking condition without loss of data even if the number of occupied middle stage switches in the existing multicast tree has already reached x.

Figure 1:
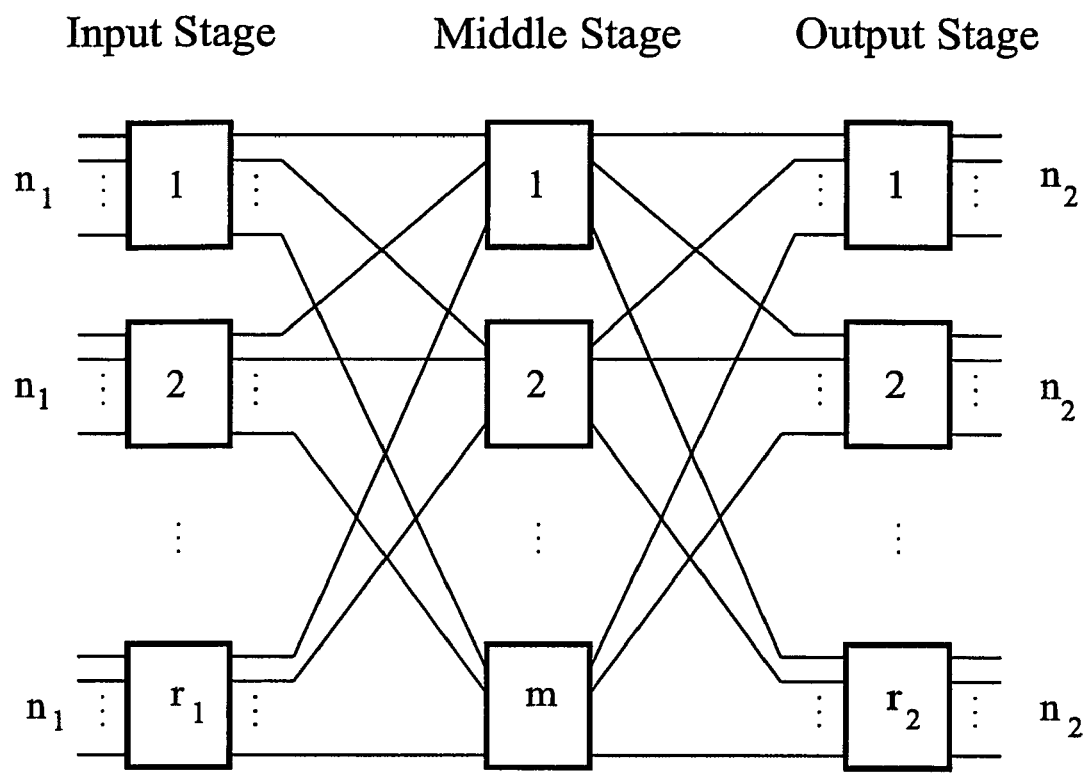
FIG. 1 is a conceptual diagram of a multicast switching system in the conventional technology.
Figure 2:
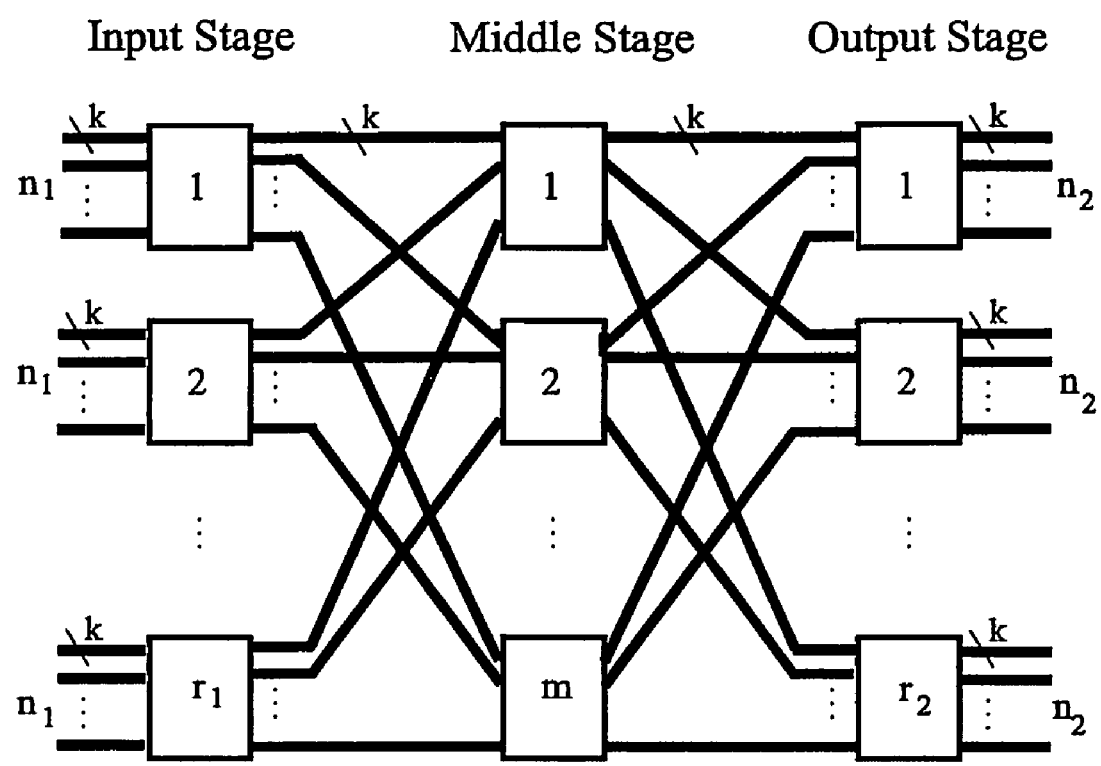
FIG. 2 is a conceptual diagram of a multicast switching system of the present invention.
Figure 3:
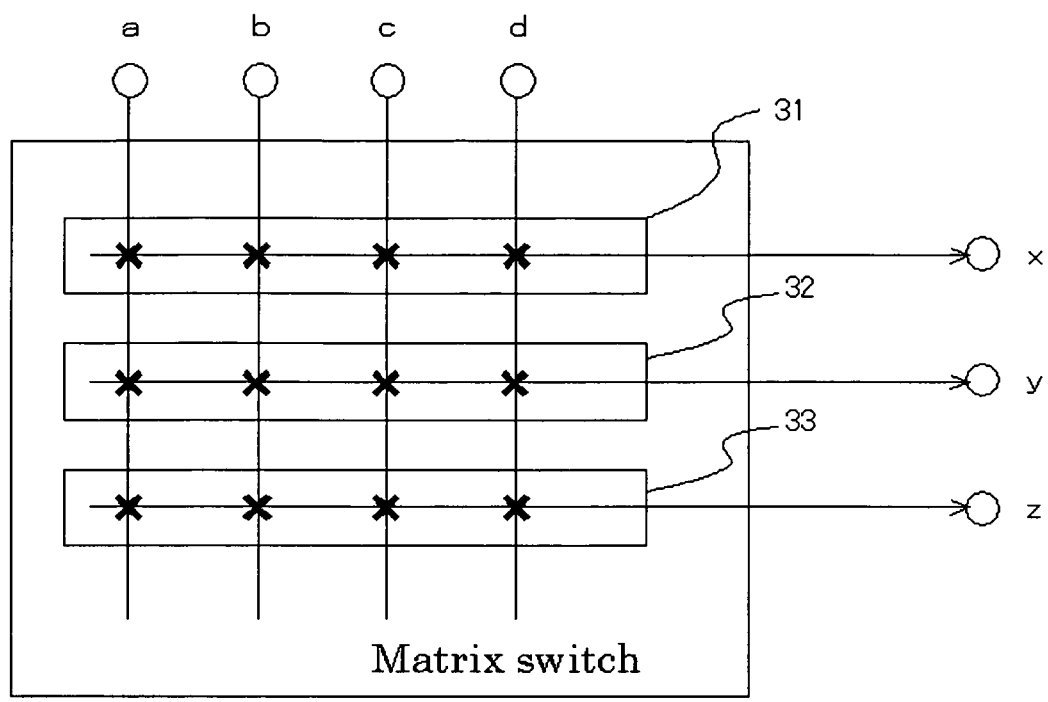
FIG. 3 is a conceptual diagram of a switch in the multicast switching system of the present invention.
Figure 4:
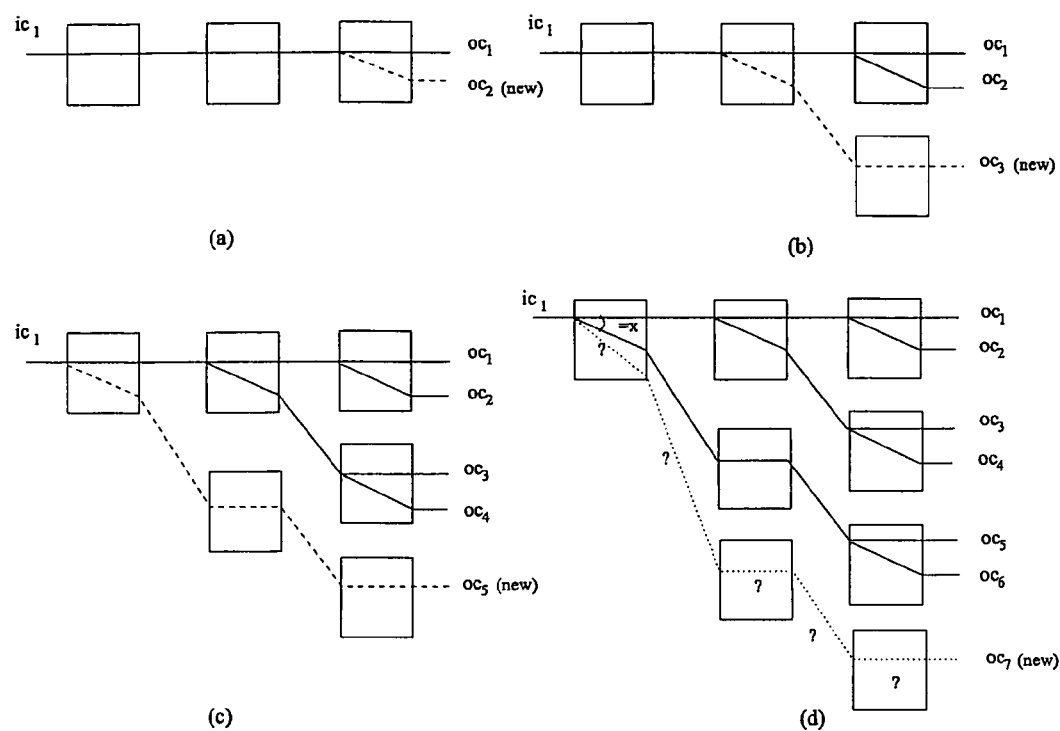
FIG. 4 is a conceptual diagram for explaining a third and a fourth embodiments of the present invention.
Figure 5:
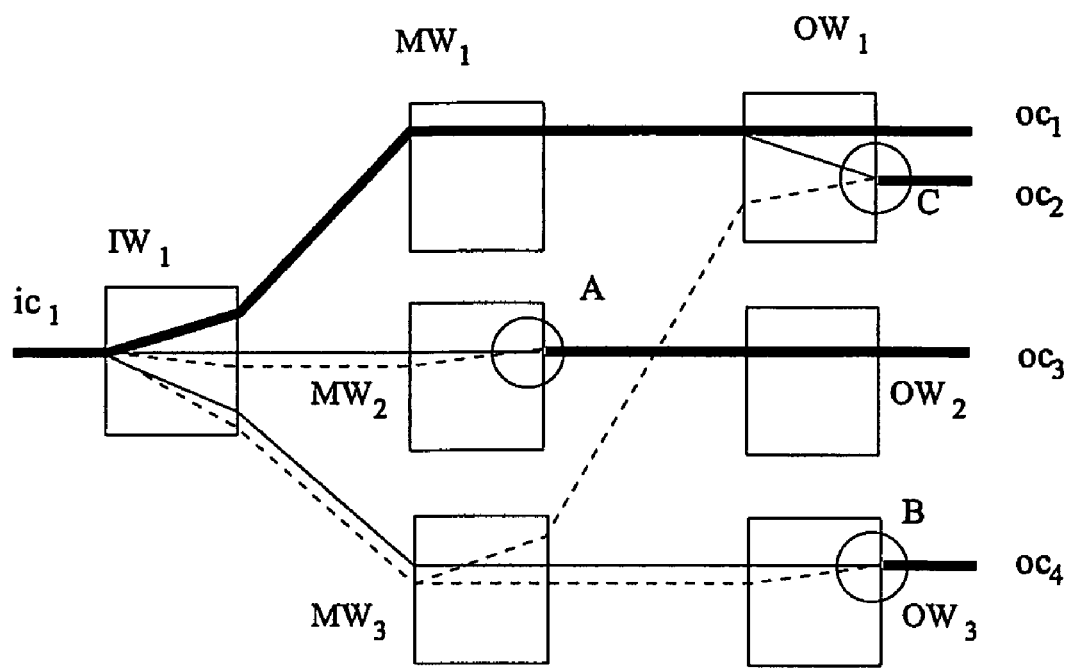
FIG. 5 is a conceptual diagram 1 for explaining a fourth embodiment of the present invention.
Figure 6:
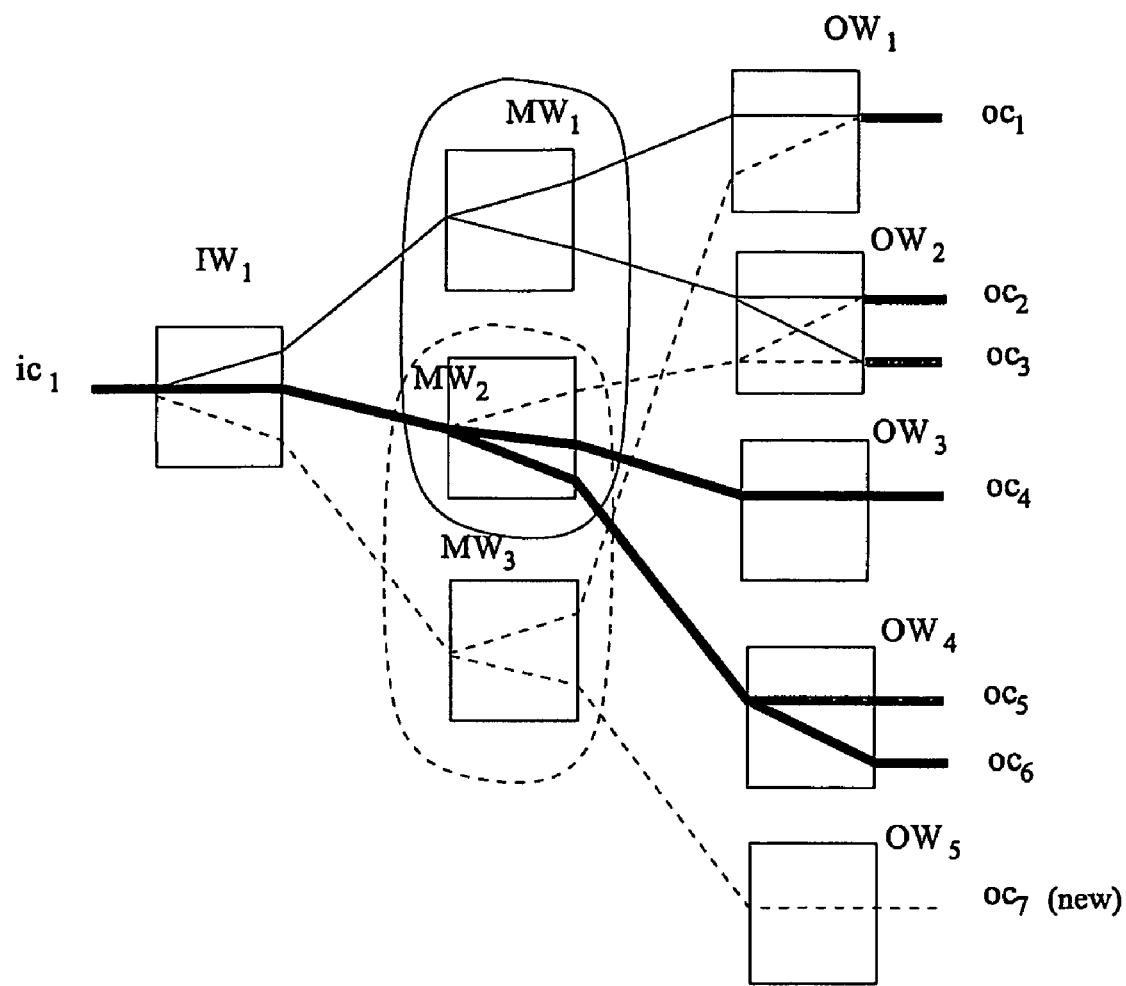
FIG. 6 is a conceptual diagram 2 for explaining a fifth embodiment of the present invention.

What is claimed is:

1. A non-blocking multicast switching system, comprising:

three stages of an input stage, a middle stage, and an output stage, said respective stages comprising a plurality of switches capable of multicasting, wherein each switch of the input stage comprises at least $n_1$ input ports, each switch of the output stage comprises at least $n_2$ output ports, each switch of the input stage comprises at least one line connected to each of all switches of the middle stage, each switch of the middle stage comprises at least one line connected to each of all switches of the output stage, a signal of said each line is multiplexed k times at maximum, where k≧2, and in cases where number of switches of the output stage is $r_2$ and number of switches of the middle stage is m, (A1) is established:

$$m > \min_{1\le x\le min\{n_2-1,r_2\}}\left\{\left\lfloor\left(n_1-\frac{1}{k}\right)x\right\rfloor+(n_2-1)r_2^{\frac{1}{x}}\right\}. \quad (A1)$$

2. A non-blocking multicast switching system, comprising:

three stages of an input stage, a middle stage, and an output stage, said respective stages comprising a plurality of switches capable of multicasting, wherein each switch of the input stage comprises $n_1$ input ports, each switch of the output stage comprises $n_2$ output ports, each switch of the input stage comprises at least one line connected to each of all switches of the middle stage, each switch of the middle stage comprises at least one line connected to each of all switches of the output stage, a signal of said each line is multiplexed k times at maximum, where k≧2, said each line has k channels at maximum, and in cases where number of switches of the output stage is $r_2$ and number of switches of the middle stage is m, (A1) is established:

$$m > \min_{1 \leq x \leq \min\{n_2-1, r_2\}} \left\{ \left\lfloor \left(n_1 - \frac{1}{k}\right)x \right\rfloor + (n_2 - 1)r_2^{\frac{1}{x}} \right\}. \quad (A1)$$

3. A design method for a non-blocking multicast switching system, the system comprising:
   three stages of an input stage, a middle stage, and an output stage, said respective stages comprising a plurality of switches capable of multicasting,
   wherein each switch of the input stage comprises at least $n_1$ input ports,
   each switch of the output stage comprises at least $n_2$ output ports,
   each switch of the input stage comprises at least one line connected to each of all switches of the middle stage,
   each switch of the middle stage comprises at least one line connected to each of all switches of the output stage,
   a signal of said each line is multiplexed k times at maximum, where $k \geq 2$, and
   in cases where number of switches of the output stage is $r_2$ and number of switches of the middle stage is m, (A1) is established:

$$m > \min_{1 \leq x \leq \min\{n_2-1, r_2\}} \left\{ \left\lfloor \left(n_1 - \frac{1}{k}\right)x \right\rfloor + (n_2 - 1)r_2^{\frac{1}{x}} \right\}. \quad (A1)$$

4. A design method for a non-blocking multicast switching system, the system comprising:
   three stages of an input stage, a middle stage, and an output stage, said respective stages comprising a plurality of switches capable of multicasting,
   wherein each switch of the input stage comprises $n_1$ input ports,
   each switch of the output stage comprises $n_2$ output ports,
   each switch of the input stage comprises at least one line connected to each of all switches of the middle stage,
   each switch of the middle stage comprises at least one line connected to each of all switches of the output stage,
   a signal of said each line is multiplexed k times at maximum, where $k \geq 2$, and
   in cases where number of switches of the output stage is $r_2$ and number of switches of the middle stage is m, (A1) is established:

$$m > \min_{1 \leq x \leq \min\{n_2-1, r_2\}} \left\{ \left\lfloor \left(n_1 - \frac{1}{k}\right)x \right\rfloor + (n_2 - 1)r_2^{\frac{1}{x}} \right\}. \quad (A1)$$

5. A non-blocking multicast switching system, comprising:
   three stages of an input stage, a middle stage, and an output stage, said respective stages comprising a plurality of switches capable of multicasting,
   wherein each switch of the input stage comprises at least $n_1$ input ports,
   each switch of the output stage comprises at least $n_2$ output ports,
   each switch of the input stage comprises at least one line connected to each of all switches of the middle stage,
   each switch of the middle stage comprises at least one line connected to each of all switches of the output stage,
   a signal of said each line is multiplexed k times at maximum, where $k \geq 2$, and
   in cases where x is a value satisfying the following formula (A1), $$m > \min_{1 \leq x \leq \min\{n_2-1, r_2\}} \left\{ \left\lfloor \left(n_1 - \frac{1}{k}\right)x \right\rfloor + (n_2 - 1)r_2^{\frac{1}{x}} \right\} \quad (A1)$$

number of switches of the output stage is $r_2$, maximum number of lines between the middle stage and the output stage is N', in which all channels in the respective lines are busy, N' is $(n_2-1)r_2$, and number of switches of the middle stage $m'_{refine}$ is obtained based on the Refining Algorithm in the following Table 1

TABLE 1

Algorithm: Refinement
    Inputs: $n_2, r_2, x, m', N'$
    Outputs: $m_{refine}'; c_1, c_2, \ldots, c_x$
begin
    01: mm' = m'; // initialization
    02: $cc_1 = cc_2 = \ldots = cc_x = 0$; // initialization
    03: while ($cc_x == 0$) {

04: $\quad cc_1 = \left\lfloor \dfrac{N'}{mm'} \right\rfloor;$

05: $\quad$ for (i = 2; i $\leq$ x; i++){

06: $\quad\quad cc_i = \left\lfloor \dfrac{(n_2-1) * cc_{i-1}}{mm'} \right\rfloor;$ 07: $\quad$ }
    08: $\quad$ if ($cc_x == 0$) {
    09: $\quad\quad m_{refine}' = mm'$; // save the value
    10: $\quad\quad c_1 = cc_1; c_1 = cc_1; \ldots; c_x = cc_x$ // save the values
    11: $\quad$ }
    12: $\quad$ mm' = mm' − 1;
    13: } //end while
end.

6. A non-blocking multicast switching system, comprising:
   three stages of an input stage, a middle stage, and an output stage, said respective stages comprising a plurality of switches capable of multicasting,
   wherein each switch of the input stage comprises $n_1$ input ports,
   each switch of the output stage comprises $n_2$ output ports,
   each switch of the input stage comprises at least one line connected to each of all switches of the middle stage,
   each switch of the middle stage comprises at least one line connected to each of all switches of the output stage,
   a signal of said each line is multiplexed k times at maximum, where $k \geq 2$, said each line has k channels at maximum, and
   in cases where x is a value satisfying the following formula (A1), $$m > \min_{1 \leq x \leq \min\{n_2-1, r_2\}} \left\{ \left\lfloor \left(n_1 - \frac{1}{k}\right)x \right\rfloor + (n_2 - 1)r_2^{\frac{1}{x}} \right\} \quad (A1)$$

number of switches of the output stage is $r_2$, maximum number of lines between the middle stage and the output stage is N', in which all channels in the respective lines are busy, N' is $(n_2-1)r_2$, and number of switches of the middle stage $m'_{refine}$ is obtained based on the Refining Algorithm in the following Table 1.

TABLE 1

Algorithm: Refinement
    Inputs: $n_2, r_2, x, m', N'$
    Outputs: $m_{refine}'; c_1, c_2, \ldots, c_x$
begin
    01: mm' = m'; // initialization
    02: $cc_1 = cc_2 = \ldots = cc_x = 0$; // initialization
    03: while ($cc_x == 0$) {
    04:
$$cc_1 = \left\lfloor \frac{N'}{mm'} \right\rfloor;$$
    05: for (i = 2; i ≤ x; i++){
    06:
$$cc_i = \left\lfloor \frac{(n_2 - 1) * cc_{i-1}}{mm'} \right\rfloor;$$
    07: }
    08: if ($cc_x == 0$) {
    09:     $m_{refine}'$ = mm'; // save the value
    10:     $c_1 = cc_1; c_1 = cc_1; \ldots; c_x = cc_x$ // save the values
    11: }
    12: mm' = mm' - 1;
    13: } //end while
end.

7. A non-blocking multicast switching system, comprising:

three stages of an input stage, a middle stage, and an output stage, said respective stages comprising a plurality of switches capable of multicasting, wherein each switch of the input stage comprises at least $n_1$ input ports, each switch of the output stage comprises at least $n_2$ output ports, each switch of the input stage comprises at least one line connected to each of all switches of the middle stage, each switch of the middle stage comprises at least one line connected to each of all switches of the output stage, a signal of said each line is multiplexed k times at maximum, where k≧2, and in cases where x is a value satisfying the following formula (A1), $$m > \min_{1 \le x \le \min\{n_2-1, r_2\}} \left\{ \left\lfloor \left(n_1 - \frac{1}{k}\right) x \right\rfloor + (n_2 - 1) r_2^{\frac{1}{x}} \right\} \quad (A1)$$

number of switches of the output stage is $r_2$, maximum number of lines between the middle stage and the output stage is N', in which all channels in the respective lines are busy, N' is $(n_2-1)r_2$, and number of switches of the middle stage $m'_{refine}$ is obtained based on the Refining Algorithm in the following

TABLE 1

Algorithm: Refinement
    Inputs: $n_2, r_2, x, m', N'$
    Outputs: $m_{refine}'; c_1, c_2, \ldots, c_x$
begin
    01: mm' = m'; // initialization
    02: $cc_1 = cc_2 = \ldots = cc_x = 0$; // initialization
    03: while ($cc_x == 0$) {

TABLE 1-continued

04:
$$cc_1 = \left\lfloor \frac{N'}{mm'} \right\rfloor;$$
    05: for (i = 2; i ≤ x; i++){
    06:
$$cc_i = \left\lfloor \frac{(n_2 - 1) * cc_{i-1}}{mm'} \right\rfloor;$$
    07: }
    08: if ($cc_x == 0$) {
    09:     $m_{refine}'$ = mm'; // save the value
    10:     $c_1 = cc_1; c_1 = cc_1; \ldots; c_x = cc_x$ // save the values
    11: }
    12: mm' = mm' - 1;
    13: } //end while
end.

8. A design method for a non-blocking multicast switching system, the system comprising:

three stages of an input stage, a middle stage, and an output stage, said respective stages comprising a plurality of switches capable of multicasting, wherein each switch of the input stage comprises $n_1$ input ports, each switch of the output stage comprises $n_2$ output ports, each switch of the input stage comprises at least one line connected to each of all switches of the middle stage, each switch of the middle stage comprises at least one line connected to each of all switches of the output stage, a signal of said each line is multiplexed k times at maximum, where k≧2, and in cases where x is a value satisfying the following formula (A1), $$m > \min_{1 \le x \le \min\{n_2-1, r_2\}} \left\{ \left\lfloor \left(n_1 - \frac{1}{k}\right) x \right\rfloor + (n_2 - 1) r_2^{\frac{1}{x}} \right\} \quad (A1)$$

number of switches of the output stage is $r_2$, maximum number of lines between the middle stage and the output stage is N', in which all channels in the respective lines are busy, N' is $(n_2-1)r_2$, and number of switches of the middle stage $m'_{refine}$ is obtained based on the Refining Algorithm in the following

TABLE 1

Algorithm: Refinement
    Inputs: $n_2, r_2, x, m', N'$
    Outputs: $m_{refine}'; c_1, c_2, \ldots, c_x$
begin
    01: mm' = m'; // initialization
    02: $cc_1 = cc_2 = \ldots = cc_x = 0$; // initialization
    03: while ($cc_x == 0$) {
    04:
$$cc_1 = \left\lfloor \frac{N'}{mm'} \right\rfloor;$$
    05: for (i = 2; i ≤ x; i++){
    06:
$$cc_i = \left\lfloor \frac{(n_2 - 1) * cc_{i-1}}{mm'} \right\rfloor;$$
    07: }

TABLE 1-continued

```
    08:  if (cc_x == 0) {
    09:      m_refine' = mm'; // save the value
    10:      c_1 = cc_1; c_1 = cc_1; ... ; c_x = cc_x // save the values
    11:  }
    12:  mm' = mm' - 1;
    13: } //end while
end.
```

9. The non-blocking multicast switching system according to any one of claims 1, 2, 5, and 6, further comprising:
a controller controlling the switch by handling the Cases in the following order,
Case 1: If a new output channel is in one of the existing output stage switches of the tree, a connection is established in the output stage switch;
Case 2: Not Case 1, and if the output stage switch that the new output channel is in is reachable from an idle channel in an output port of one of the existing middle stage switches, a connection is made in the middle stage switch, thereby making a connection from the idle channel;
Case 3: Not Cases 1 and 2, and if the existing multicast tree has used less than x (an upper limit value of number of the middle stage switches for one source due to system limitation) middle stage switches, an available middle stage switch, which has an idle output port channel and an idle input port channel, is not included the multicast tree, and leads to (via an interstage link) the output stage switch, is selected, thereby making a connection.

10. The non-blocking multicast switching system according to any one of claims 1, 2, 5, and 6, further comprising:
a controller controlling a connection between the switch outputting source of the input stage and the middle stage switch selected base on the Routing Algorithm

TABLE 2

Algorithm: BuildNewMcastTree

```
Inputs:
    < ic1,McastAddr_new >; // ic1: new mcast con. request, McastAddr: a set of output stage switches
    A = {0,1,...,m' - 1}; // set of available middle stage switches for new mcast. con. request
    M_0,M_1,...,M_{m'-1}; // destination multisets, including existing tree rooted at i$$
    F_exist = {i_1,i_2,...,i_x} ⊂ A; // set of middle stage switches on existing mcast tree
    LM_{i_1},LM_{i_2},...,LM_{i_x}; // set of local mcast. addresses in F_exist in terms of output stage switches
    c_1,c_2,...,c_x; // system parameters: bounds on minimum cardinalities
Outputs:
    F_new ⊂ A; // set of selected middle stage switches for new mcast tree
    LM_{new,i} for i ∈ F_new; // local mcast addresses for selected middle switches
begin
    01:  for q ∈ A, let W_q = M_q - LM_q if q ∈ F_exist; W_q = M_q otherwise;
    02:  for q ∈ A, let V_q = {i|i^k ∈ W_q}; // set of output switches not reachable from middle switch q
main-function( )
{
    03:  MASK = McastAddr_new; // a set of output switches
    04:  F_new = { }; // initialized as an empty set
    05:  for (j = 1; j ≤ x; j ++) {
    06:      if (MASK == φ)
    07:          break;
    08:      p = select(c_j, MASK); // find a middle switch
    09:      A = A - {p}; // update the set of available middle stage switches
    10:      F_new = F_new ∪ {p}; // add p as a new selected middle stage switch
    11:      LM_{new,p} = MASK - V_p; // new local mcast address in middle switch p
    12:      MASK = MASK ∩ V_p; // update MASK
    13:  } // end-for
} // end main-function
int select(c_j, MASK)
{
    14:  let S = {q| |V_q ∩ MASK| ≤ c_j, q ∈ F_exist}; // check middle switches in existing mcast tree
    15:  if (S ≠ φ) {
    16:      find p such that |MASK - V_p - LM_p| = min_{q∈S} |MASK - V_q - LM_q|; // see (22)
    17:      F_exist = F_exist - {p}; // update F_exist
    18:      return p;
    19:  } else { // cannot select a proper middle switch in existing tree
    20:      find any p ∈ A such that |V_p ∩ MASK| ≤ c_j;
    21:      return p;
    22:  } // end if-else
} // end select
end.
```

* * * * *